Figures 1, 2:
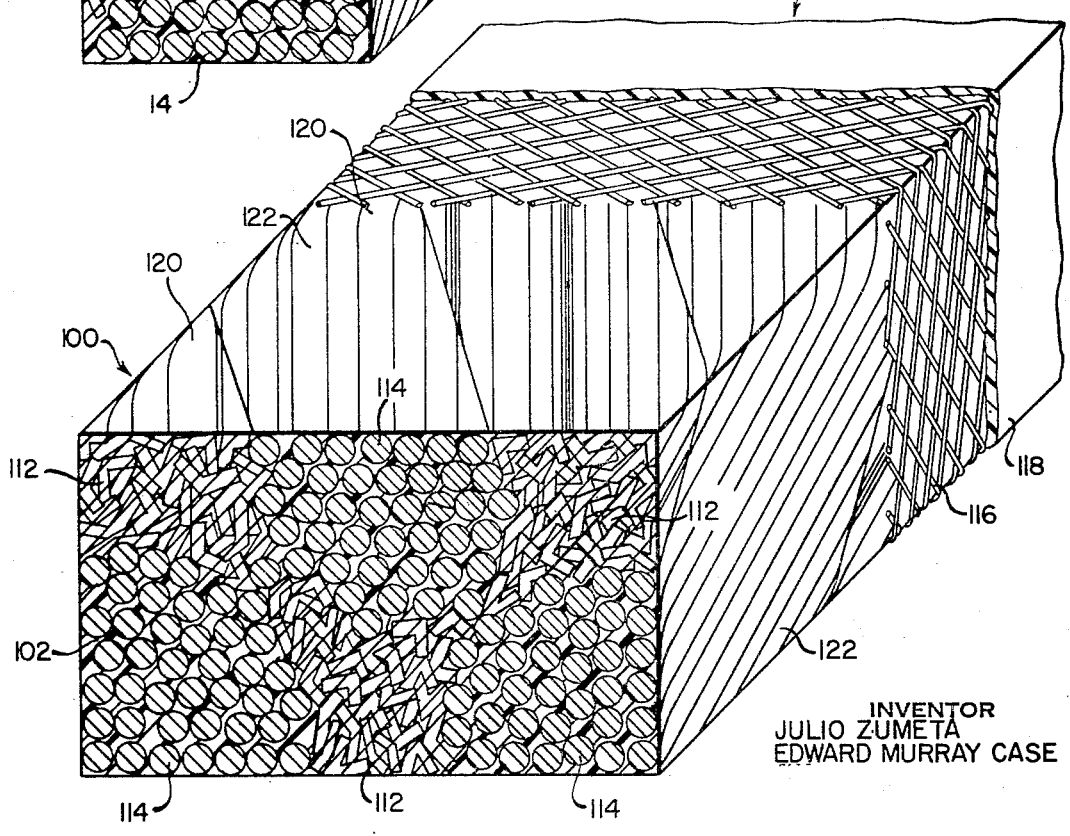

INVENTOR
JULIO ZUMETA
EDWARD MURRAY CASE

United States Patent Office 3,438,841
Patented Apr. 15, 1969

3,438,841
PACKING MATERIAL
Julio Zumeta, New York, N.Y., and Edward Murray Case, Weston, Conn., assignors to The Marlo Company, Inc., New York, N.Y.
Filed Mar. 3, 1965, Ser. No. 436,800
Int. Cl. D03d 11/00
U.S. Cl. 161—47        15 Claims This invention relates to a new and improved packing material especially adapted for use in mechanical equipment, particularly mechanical equipment having a movable shaft such as a pump or valve and to a process for making this material. More particularly, this invention relates to a new and improved packing material and a method of making this packing material so that it can withstand the friction, corrosive liquids, high temperatures, and high rotational speeds which are encountered in utilizing mechanical equipment especially mechanical equipment containing a movable shaft.

Heretofore considerable difficulty has been encountered in providing a satisfactory packing for mechanical equipment, particularly valves, pumps or other equipment having a movable shaft. This is true since this type of equipment utilizes corrosive liquids, high temperatures, high rotational speeds which tend to destroy most conventional packing material. Furthermore, the friction developed between the movable shaft and the packing material is extremely hard on the packing material so that conventional packing materials are eventually worn down. A variety of packing materials, such as cellulose, glass, metal, polytetrafluoroethylene have been developed and used as packing for mechanical equipment having a movable shaft. However, all of these materials have had an unsatisfactory short life due to the pressure, heat and friction that is encountered during their use as packing materials in mechanical equipment, particularly mechanical equipment having a movable shaft. Material such as polytetrafluoroethylene have been found to be poor when utilized as packing material due to the fact that a polytetrafluoroethylene packing does not function well at high temperatures. This is true since polytetrafluoroethylene has a low thermal conductivity which retards heat dissipation as well as high coefficient of thermal expansion. Furthermore, materials such as glass also have been found unsuitable for packing materials since glass is relatively brittle and does not withstand excessive flexing which is encountered when it is used alone as a packing material in mechanical equipment, particularly mechanical equipment having a movable shaft. Additionally, materials such as metals also have been found unsatisfactory for use as a packing material in mechanical equipment, particularly equipment having a movable shaft, since metals have an undesirably low resiliency.

It is an object of this invention to provide a packing material for use in mechanical equipment, especially mechanical equipment having a movable shaft, such as pumps, valves, etc. which has a high durability so that it can withstand friction and pressure developed by the movable shaft against the packing material.

It is a further object of the invention to provide a durable packing material for mechanical equipment, especially mechanical equipment having a movable shaft, that can withstand high temperatures and corrosive liquids.

It is still another object of the invention to provide a durable packing material for use in mechanical equipment that has a high resiliency and which is a good conductor and dissipator of heat.

Other and further objects of this invention will become apparent from the following description and drawings.

FIG. 1 is an enlarged perspective view of a packing material according to this invention which is substantially square in cross-section and composed of one metallic cord formed from a plurality of inter-twisted strips of an anti-frictional metal and one non-metallic cord formed from a plurality of inter-twisted polytetrafluoroethylene impregnated strips of a non-metallic fibrous material.

FIG. 2 is an enlarged perspective view of the packing material of this invention which is substantially rectangular in cross-section and composed of three metallic cords each metallic cord being formed from a plurality of inter-twisted strips of a non-frictional metal and three non-metallic cords being formed from a plurality of inter-twisted polytetrafluoroethylene impregnated strips of a non-metallic fibrous material.

It has been discovered that the objects of this invention may be accomplished by providing a packing material having two end-surfaces, the packing material being formed by inter-twisting at least one metallic cord composed of a plurality of inter-twisted strips of an anti-frictional metal with at least one non-metallic cord composed of polytetrafluoroethylene impregnated inter-twisted strips of a fibrous material in such a manner that all of the non-metallic cords are inter-twisted with all of the metallic cords and all of the inter-twisted cords continually extend from one end surface to the other, and enclosing the outer surface of the inter-twisted cords with polytetrafluoroethylene either by coating the outer surface of the inter-twisted cords with polytetrafluoroethylene or by wrapping a plurality of fibrous strips of polytetrafluoroethylene on the outer surface of the inter-twisted cords. In a preferred embodiment of this invention, the inter-twisted cords may be wrapped with or encased in a loosely braided or woven sleeve of non-metallic fibrous material which then may be coated with polytetrafluoroethylene. By means of the novel construction of the packing material of this invention, we have found that the metallic and non-metallic materials are utilized in such a manner that a packing material is obtained that can withstand friction, corrosive liquids, high temperatures, high rotational speeds, as well as the stresses and strains which result from bending, compression and tension. Furthermore, the continuous extension of the cords from one end surface to the other end surface, provides an effective means for dissipating heat where it is developed at one surface. This is accomplished by the fact that this construction allows heat to be conducted away from the end surface at which the heat develops to the other surface. This makes this packing material ideally suited for use as packing in mechanical equipment having a movable shaft wherein heat is developed at the end surface which contacts the shaft due to the friction between the movable shaft and this end surface and is dissipated at the end surface which does not contact the shaft.

When this packing material is utilized in any equipment having a movable shaft such as a pump, etc. one of the end surfaces of this packing material becomes the surface which the moving shaft comes in contact with, whereas the other end surface does not contact the moving shaft. In this type of equipment, we have found, that the novel packing construction of this invention has a durability and wear that is not found in these or other comparable materials. A cause of this is attributable to the fact that the friction developed between the movable shaft and the end surface which it contacts causes a small portion of the metal in this end surface to spread over the end surface in the form of a thin protective film.

The metallic cord is composed of a plurality of continuous metal strips which have been formed into a cord through inter-twisting by means of twisting, braiding, crimping or other conventional inter-twisting means. It is preferred that the metal cord be composed of narrow thin strips of foil of an anti-frictional metal which can be in the form of channels or V's in cross-sections and that the cord be formed by inter-twisting. A cord of this structure has excellent resiliency and good heat conducting properties. The metal used in the metallic cord may be any metal having low frictional or anti-frictional properties such as aluminum, copper, lead, iron, steel, tin, etc., as well as alloys such as Babbitt, brass, bronze, lead alloys, etc. By the term anti-frictional metals as used throughout the specification and claims we mean metals which are sufficiently plastic to fit themselves into the shape of a shaft.

The non-metallic cord can be composed of a plurality of inter-twisted, non-metallic continuous strips of non-metallic fibrous materials such as glass, hemp, jute, nylon, Orlon (polyacrylonitrile fibers), Dacron, vinyl chloride and vinyl acetate, homopolymers and copolymers, cellulose acetate, cotton, wool, ramie, flax, asbestos, etc. The continuous strips may be composed of fibrous material in the form of a fiber, a filament or a roving which may be either woven or non-woven. The non-metallic fibrous materials are impregnated with an amount of polytetrafluoroethylene such that the dry impregnated fibrous materials contain about 10% to about 40% by weight of polytetrafluoroethylene, based on the weight of the dry impregnated fibrous material. The impregnated non-metallic fibrous materials can be inter-twisted into a cord by means of twisting, braiding, crimping, or any other suitable means. If desired, the non-metallic cord may be formed first from unimpregnated non-metallic fibrous material and subsequently impregnated with polytetrafluoroethylene in such an amount that the dry impregnated cord contains from about 10% to about 40% by weight of polytetrafluoroethylene, based on the weight of dry, impregnated fibrous material. For best results, the choice of material for use in making the non-metallic cord depends on the nature of the liquid to which it is to be exposed and the temperature to which it is to be exposed when in use. Asbestos is most suitable for high operating temperatures or for use with caustic liquids. Vegetable fiber materials are most suitable if the liquid used is an organic acid.

The polytetrafluoroethylene used for the impregnation of the strips of the non-metallic fibrous material or the non-metallic fibrous cords can be applied in the form of an aqueous dispersion or suspension which contains from about 30% to about 70% by weight of polytetrafluoroethylene, based on the weight of the total aqueous dispersion, and from about 1% to about 10% by weight of wetting agent or mixtures thereof, based on the weight of the polytetrafluoroethylene. The composition may also contain an ancillary wetting agent. Examples of wetting agents which are suitable for use in this invention are the sodium salt of a sulfuric acid ester of a monohydric alcohol, such as lauryl alcohol or an octyl phenyl polyglycol ether. The alkylamine salts of alkyl benzene sulfonic acids, such as the butyl amine salt of dodecyl benzene sulfonic acid, are suitable ancillary wetting agents.

Impregnation of the strips of fibrous materials which are used in making the non-metallic cord or impregnation of the non-metallic cord is normally accomplished by immersing the strips or cords in a polytetrafluoroethylene dispersion or suspension for a period of from about 10 seconds to 10 minutes at a temperature within the range of from about 50° F. to 150° F. The impregnated strips or cords are removed from the impregnating medium and dried at a temperature within the range of from about 80° F. to 150° F. Drying may be also accomplished by allowing the impregnated strips or cords to stand at room temperature or by sweeping the strips or cords with air or an inert gas which has been heated to a temperature within the range of about 150° F. to 200° F. The time and temperature of the impregnation is adjusted so that the impregnated strips or cords contain from about 10% to about 40% by weight of polytetrafluoroethylene, based on the weight on the dry impregnated strips or cords.

When the packing material is relatively small in cross-section or is formed from a relatively small number of metallic and non-metallic cords, it is preferred that the cords be interwisted by twisting and in this event it is preferred that the direction of the twist is counter to the direction of the twist given to the strips used in forming the individual cords. If the packing material is relatively large in cross-section or is formed from a relatively large number of metallic and non-metallic cords, it is preferred that the cords be inter-twisted by braiding. Any of the conventional types of braids, such as twisted, square, interlacing or braid-over-braid, may be used and formed by the techniques described in the Handbook of Mechanical Packing and Gasket Material (Library of Congress Catalogue 60–16524), issued by the Mechanical Packing Association, 17 John Street, New York, N.Y.

The packing material formed from metallic and non-metallic cords can be enclosed in polytetrafluoroethylene by wrapping the inter-twisted cords with fibrous strands of polytetrafluoroethylene or by coating the inter-twisted cords with polytetrafluoroethylene. If a coating is used, this may be accomplished by spraying or brushing an aqueous polytetrafluoroethylene emulsion or suspension on the surface of the packing material and drying the coated product. The same emulsion of polytetrafluoroethylene and the same drying technique used in impregnating the non-metallic fibrous strips or cords may be used in coating the inter-twisted cords. If polytetrafluoroethylene is applied in the form of fibrous strips, these strips may each be composed of one or a plurality of rovings or filaments.

The packing material may, if desired, be formed by having an outer non-metallic fibrous layer which has been applied by loosely winding strips of either woven or non-woven non-metallic fibrous material, said strips being formed from fibers, rovings or filaments of a fibrous material, about the inter-twisted cords or by enclosing the inter-twisted cords in a loosely braided or woven sleeve of non-metallic fibrous material. The inter-twisted cords may be enclosed, if desired, in polytetrafluoroethylene before applying the fibrous sleeve or winding. On the other hand, the sleeve or winding enclosing the inter-twisted cords may, if desired, be impregnated with polytetrafluoroethylene. Impregnation of the fibrous sleeve or winding with polytetrafluoroethylene may take place after the inter-twisted cords are enclosed in the sleeve or winding or before the application of the sleeve or winding to the packing material. Furthermore, the inter-twisted cords may be impregnated with polytetrafluoroethylene prior to their being enclosed in the fibrous winding or sleeve and the fibrous winding or sleeve may also be impregnated with polytetrafluoroethylene. Therfore, at least either the outer fibrous sleeve or winding or the inter-twisted cords or both can be impregnated with or wrapped with polytetrafluoroethylene. In any event impregnation may be accomplished in the same way and by the use of the same aqueous dispersion or suspension of polytetrafluoroethylene heretofore described in connection with impregnating the non-metallic fibrous material or cords which form the packing material. The fibrous material used to form the outer layer of the packing material can be any of the materials which was designed for use in forming the non-metallic fibrous cord.

The packing material in FIG. 1, generally indicated as 10, consists of a metallic cord 12 formed by inter-twisting a plurality of metallic strips in a clockwise direction and a polytetrafluoroethylene impregnated non-metallic cord 14 formed by inter-twisting a plurality of non-metallic fibrous strips in a clockwise direction which have been combined by inter-twisting in a counter-clockwise direction. The packing material of FIG. 1 has an outer layer 16 of a wound-on strip of a non-metallic fibrous material and a polytetrafluoroethylene coating 18. Beneath the coating are disconnected metallic areas 20 and non-metallic areas 22.

The packing material of FIG. 2 generally indicated at 100, having end surfaces 102 and 102', consist of three metallic cords 112 formed by inter-twisting in a clockwise direction continuous strips of an anti-frictional metal, combined by inter-twisting in a counter-clockwise direction with three polytetrafluoroethylene impregnated non-metallic cords 114 formed by inter-twisting continuous strips of non-metallic fibrous material in a clockwise direction. The packing material of FIG. 2 is enclosed in a braided sleeve 116 formed from strips of a non-metallic fibrous material which has a polytetrafluoroethylene coating 118. The surface beneath the coating is a mosaic pattern of metallic areas 120 and non-metallic areas 122.

The packing material of this invention is constructed so that each metallic cord 112 and each non-metallic cord 114 continually extend from one end surface 102 to the other end surface 102'. The strips of fibrous and metallic material which make up the cords 114 and 112 respectively also extend continuously from end surface 102 to end surface 102'. The inter-twisting of the metallic strips to form cord 112 and the inter-twisting of the non-metallic strips to form cord 114 is performed so that both the metallic and non-metallic strips extend continuously in a convoluted or helical form from end surface 102 to end surface 102'. Additionally, the inter-twisting of the metallic cords 112 with the non-metallic cords 114 is carried out in such a manner that the cords 112 and 114 continuously extend in a convoluted or helical form from end surface 102 to 102'. In the construction of the packing material of this invention, every metallic cord 112 is inter-twisted with every non-metallic cord 114 so that each of the metallic cords 112 are separated from each other by the non-metallic cords 114.

The following examples illustrate embodiments of this invention by way of illustration only.

Example 1

A metallic cord is prepared from one sixteenth inch wide strips of Babbitt metal foil, which are channel shaped in cross-section, by gathering strips together and twisting them in a clockwise direction to make a loose cord about one-quarter inch in diameter. Asbestos rovings of about 1½" long are impregnated with polytetrafluoroethylene by immersion for 5 minutes in an emulsion containing 50% by weight of polytetrafluoroethylene, based on total composition, and 3% of the sodium salt of the sulfonic ester of octyl phenyl polyglycol ether, removed, and allowed to dry at room temperature. The dried impregnated rovings contain about 35% by weight of polytetrafluoroethylene. The dried impregnated rovings are gathered together and twisted in a clockwise direction to provide a loose cord about one-quarter inch in diameter. The metal and asbestos fiber cords are formed into a unit by twisting the cords together in a counter-clockwise direction. This unit is shaped by calendering so that it is substantially square in cross-section. The shaped unit is tightly wound along its length with a continuous asbestos fiber strand to provide an asbestos fiber-coated unit having exposed portions of the metallic and non-metallic cords between the strands of the winding. The wound unit is given a coating of polytetrafluoroethylene by brushing an emulsion of polytetrafluoroethylene onto the surface thereof and allowing the coating to dry at room temperature. The same emulsion is used for coating as is used in impregnating.

Example 2

Three of the metallic cords used in making the packing of Example 1 are combined with three non-metallic cords which have been made by combining flax rovings by twisting in a clockwise direction to provide loose strands and impregnating the loose flax strands with polytetrafluoroethylene, according to the procedure of Example 1, so that the dried strands contain about 35% by weight of polytetrafluoroethylene. The metallic and non-metallic cords are combined into a unit by twisting the cords in a counter-clockwise direction. The twisted unit is encased in a loosely braided sleeve of flax threads. The encased unit is shaped by calendering so that it is rectangular in cross-section and given a coating of polytetrafluoroethylene in the same way as in Example 1, and dried at room temperature.

The outer covering of wound on, braided or woven material acts to hold the packing material together and to retain its shape until and while it is being inserted into the stuffing box. A freshly inserted packing undergoes a wearing-in process and during the wearing-in period the outer fibrous covering which comes in contact with the moving shaft is worn away if it is non-metallic and loses its fibrous nature and is spread out in a layer if it is metallic. The coating of polytetrafluoroethylene acts as a lubricant during the wearing-in period and reduces friction which otherwise would cause heat or frictional damage to the packing and particularly to the non-metallic part of the packing. As the wearing-in process proceeds, the wearing surface of the packing becomes covered with a continuous metallic layer or film due to frictional action on the metallic part of the packing. The metallic layer or film formed on the wearing surface of the packing acts to prepare the non-metallic part of the packing from wear and thus prolongs the life of the packing. The non-metallic fibrous part of the packing provides resiliency and spring to the packing. The life of the packing depends largely on the life of the non-metallic part. The life of the non-metallic part is prolonged by the polytetrafluoroethylene with which it is impregnated, since this substance is heat resistant and substantially chemically inert and enables the non-metallic fibrous part to stand up under higher operating temperatures and to exposure to chemicals which would otherwise quickly decompose it and render the packing useless. The non-metallic part also acts as a base to hold the polytetrafluoroethylene and makes it possible for polytetrafluoroethylene to be present in a packing which has a high degree of resiliency and springiness.

The metallic part of the packing contributes to the effect of the polytetrafluoroethylene impregnated into the non-metallic part in prolonging the life of the packing because it acts to conduct heat from the rubbing surface to the other surfaces of the packing. Polytetrafluoroethylene and non-metallic fibrous materials are poor heat conductors and vegetable fibers have a tendency to break down at elevated temperatures, so that the metallic part of the packing enables the packing to have a markedly longer life by virtue of its ability to conduct heat away from the wearing surface of the packing to the other surfaces where it may be dissipated. The metallic part of the packing also acts to provide a metallic layer or film on the worked-in packing which reduces friction and prolongs the life of the packing.

The combination of the metallic, non-metallic and polytetrafluoroethylene components of the packing of this invention provide a packing material which has qualities with respect to performance at elevated temperatures and under exposure to corrosive chemicals far superior to the performance of a packing material composed of one only or of any two of the three components of the packing material herein described. By the above construction it is apparent that the three components function in an interrelated and cooperative manner to provide a packing which is able to withstand the action of friction, corrosive chemicals and have a long effective life at elevated temperatures.

What is claimed is:

1. A packing material comprising two end surfaces, at least one metallic cord containing a plurality of inter-twisted metallic strips of an anti-frictional metal, at least one fibrous non-metallic cord containing a plurality of inter-twisted strips of a fibrous material said fibrous cord being impregnated with polytetrafluoroethylene, each of said metallic cords being inter-twisted with each of said fibrous cords, said inter-twisted cords continuously extending from one of said end surfaces to the other of said end surfaces, the outer surfaces of said inter-twisted cord being enclosed with polytetrafluoroethylene.

2. The packing material of claim 1 wherein said inter-twisted cords are enclosed in polytetrafluoroethylene by wrapping strips of polytetrafluoroethylene around said inter-twisted cords.

3. The packing material according to claim 1 wherein the inter-twisted cords are enclosed in a coating of polytetrafluoroethylene.

4. A packing material comprising two end surfaces, at least one metallic cord containing a plurality of inter-twisted metal strips of an anti-frictional metal, at least one fibrous non-metallic cord containing a plurality of polytetrafluoroethylene impregnated inter-twisted strips of non-metallic fibrous material, each of said metallic cords being inter-twisted with each of said fibrous cords, said inter-twisted fibrous cords and said inter-twisted metallic cords continuously extending from one of said end surfaces to the other of said end surfaces, said inter-twisted cords being enclosed with an external layer of polytetrafluoroethylene impregnated non-metallic fibrous material.

5. A packing material according to claim 4 wherein the external layer is composed of wound polytetrafluoroethylene impregnated non-metallic fibrous fibres.

6. A packing material according to claim 4 wherein the external layer is a fibrous sleeve which is impregnated with polytetrafluoroethylene.

7. A packing material according to claim 6, wherein the inter-twisted cords have a coating of polytetrafluoroethylene.

8. A packing material comprising two end surfaces, at least one metallic cord containing a plurality of inter-twisted strips of an anti-frictional metal, at least one non-metallic fibrous cord containing a plurality of polytetrafluoroethylene impregnated inter-twisted strips of a fibrous non-metallic material, said fibrous strips being inter-twisted in the same direction as said metallic strips, each of said metallic cords being inter-twisted with each of said non-metallic cords in a direction opposite to the direction of inter-twist of said metallic strips, said intertwisted metallic cords and said fibrous cords continuously extending from one of said end surfaces to the other of said end surfaces, the outer surface of said inter-twisted cords being enclosed with polytetrafluoroethylene.

9. A packing material according to claim 8, wherein the outer surface of the inter-twisted cords is enclosed in a coating of polytetrafluoroethylene.

10. The packing material of claim 8 wherein the outer surface of the inter-twisted cords is wrapped in a plurality of polytetrafluoroethylene strips.

11. A packing material according to claim 8 wherein inter-twisted cords are encased in a layer of polytetrafluoroethylene impregnated fibrous material.

12. A process for making a packing material having two end surfaces, comprising the steps of forming at least one metallic cord by inter-twisting a plurality of strips of an anti-frictional metal, forming a non-metallic cord by inter-twisting a plurality of strips of a non-metallic fibrous material, impregnating said fibrous cord with polytetrafluoroethylene, inter-twisting each of said metal cords with each of said fibrous cords so that all of the inter-twisted cords continually extend from one of said end surfaces to the other of said end surfaces, and enclosing the outer surface of the intertwisted cord with polytetrafluoroethylene.

13. A process for making a packing material having two end surfaces, comprising the steps of forming at least one metallic cord by inter-twisting a plurality of strips of an anti-frictional metal, forming a non-metallic fibrous cord by inter-twisting a plurality of strips of a non-metallic fibrous material, impregnating said fibrous cord with polytetrafluoroethylene, inter-twisting each of said metallic cords with each of said fibrous cords so that all of the intertwisted cords continually extend from one of said end surfaces to the other of said end surfaces and coating the outer surface of the inter-twisted cord with polytetrafluoroethylene.

14. A process for making a packing material having two end surfaces, comprising the steps of forming at least one metallic cord by inter-twisting a plurality of strips of an anti-frictional metal, forming a non-metallic fibrous cord by inter-twisting a plurality of strips of a non-metallic fibrous material, impregnating said fibrous cord with polytetrafluoroethylene, inter-twisting each of said metallic cords with each of said fibrous cords so that all of the inter-twisted cords continually extend from one of said end surfaces to the order of said end surfaces and wrapping a plurality of polytetrafluoroethylene strips over the outer surface of said inter-twisted cords.

15. A process for making a packing material having two end surfaces, comprising the steps of forming at least one metallic cord by inter-twisting a plurality of strips of an anti-frictional metal, forming a non-metallic fibrous cord by inter-twisting a plurality of strips of a non-metallic fibrous material, impregnating said fibrous cord with polytetrafluoroethylene, inter-twisting each of said metallic cords with each of said fibrous cords so that all of the inter-twisted cords continually extend from one of said end surfaces to the other of said end surfaces and encasing the outer surface of said inter-twisted cords in a fibrous sleeve which is impregnated with polytetrafluoroethylene.

References Cited

UNITED STATES PATENTS

| 3,341,211 | 9/1967 | Houghton et al. | 277—230 X |
| 3,271,039 | 9/1966 | Kohl et al. | 277—230 X |
| 3,031,357 | 4/1962 | Balkin et al. | 277—229 X |
| 2,953,418 | 9/1960 | Runton et al. | 161—189 X |

ROBERT F. BURNETT, *Primary Examiner.*

M. A. LITMAN, *Assistant Examiner.*

U.S. Cl. X.R.

161—98, 82, 189; 277—235; 57—147, 153; 285—424